United States Patent [19]

Gumen et al.

[11] 4,088,908

[45] May 9, 1978

[54] PHOTOELECTRIC POSITION SENSOR OF STEP MOTOR

[76] Inventors: Valery Fedorovich Gumen, Kirovsky prospekt, 27, kv. 112; Tatyana Vasilievna Kalininskaya, prospekt Metallistov, 21, korpus 2, kv. 98; Robert Nikolaevich Loparev, Torzhkovskaya ulitsa, 16, kv. 38; German Vladimirovich Sladkov, ulitsa B. Podyacheskaya, 23, kv. 12, all of Leningrad, U.S.S.R.

[21] Appl. No.: 754,433

[22] Filed: Dec. 27, 1976

[51] Int. Cl.² ........................................... H02K 37/00
[52] U.S. Cl. ................................. 310/49 R; 310/46; 310/68 B; 318/254
[58] Field of Search .............. 310/68 R, 68 B, 46, 310/49; 318/685, 696, 138, 254

[56] References Cited

U.S. PATENT DOCUMENTS

| | | | |
|---|---|---|---|
| 2,919,358 | 12/1959 | Marrison | 310/46 |
| 3,096,467 | 7/1963 | Angus et al. | 318/138 |
| 3,612,926 | 10/1971 | Zizelman | 318/254 X |

*Primary Examiner*—Donovan F. Duggan
*Attorney, Agent, or Firm*—Lackenbach, Lilling & Siegel

[57] ABSTRACT

In a photoelectric position sensor of a step motor a mirror pyramid is placed across the light beam from a light source and secured on the shaft of the step motor. The faces of the mirror pyramid reflect the light beam to a faceted mirror reflector. The light beam is reflected from a respective facet of the mirror reflector and transferred to a photoelectric receiver by means of light guides. The design of the sensor ensures high resolution and a small moment of load inertia produced by the mirror pyramid on the shaft of the step motor.

3 Claims, 4 Drawing Figures

PHOTOELECTRIC POSITION SENSOR OF STEP MOTOR

This invention relates to elements of an automatic motor drive and, in particular, to a photoelectric position sensor of a step motor, which is employed mainly for obtaining information on processing of control pulses fed to the step motor.

In order to improve efficiency, response and precision of a step motor, which is employed in coordinatographs, programmed machines, sensitometric and other follow-up instrumental systems, as well as various mechanisms featuring digital control systems, it is necessary that the operational speeds of the step motor are increased and this involves installation of a motor, usually a low-power one, on the shaft to provide for the position sensor of this step motor.

Step motors find extensive applications in modern practice and the design of the step motor position sensors should be relatively simple and reliable. Besides, the current tendency for reduction of the discreteness of motor positions (the length of steps) calls for high resolution of sensors without, however, producing a superfluous moment of load inertia on the shaft of the motor.

There is known a photoelectric position sensor of a step motor, which produces a pulse at each position turn of the motor.

This sensor comprises a slotted disk rigidly secured to the shaft of the step motor. A light source and an optical unit are located on one side of the disk, whereas photodiodes connected to a conversion unit are located on the other side of the disk. The number of slots in the disk is selected in accordance with the number of fixed positions for one revolution of the step motor. With such design any increase in the number of fixed positions for a revolution of the step motor results in larger diameter of the disk, which significantly adds to the moment of inertia of said disk and, consequently, adds to the moment of load inertia of the step motor.

There is also known a photoelectric position sensor of a step motor, which comprises an encased light source, a mirror pyramid placed across the light beam from said source and secured on the shaft of the step motor, its faces reflecting the light beam to the photoelectric receiver.

The dicreteness of this photoelectric sensor is in direct proportion to the number of faces of the mirror pyramid. With such design the increase of the sensor resolution involves, like in the above described sensor, larger dimensions of the mirror pyramid and, consequently, adds to the moment of load inertia on the shaft of the step motor.

It is an object of this invention to provide a photoelectric position sensor of a step motor, which possesses high resolution and a small moment of load inertia produced by the sensor construction elements on the shaft of the step motor.

This and other objects and advantages of the invention are achieved by a step motor photoelectric position sensor comprising an encased light source, a mirror pyramid placed across the light beam from said source and secured on the shaft of the step motor, its faces reflecting the light beam to a photoelectric receiver. Also, there is a faceted mirror reflector positioned in the casing across the light beam reflected from a respective face of the mirror pyramid, and light guides, their number being dependent upon the ratio between the number of positions for one revolution of the step motor and the produce of the number of faces of the mirror pyramid by the number of facets of the mirror reflector. Some ends of the light guides being placed across the light beam reflected from a respective facet of the mirror reflector, and the light beam emerging from other ends of said light guides falling upon the photoelectric receiver.

It is advisable that the photoelectric sensor comprise a condenser placed between the ends of the light guides facing the photoelectric receiver and said receiver in the light beam emerging from these ends of the light guides.

The disclosed photoelectric position sensor of a step motor possesses high resolution, small dimensions and a low moment of load inertia produced by the mirror pyramid on the shaft of the step motor. This is achieved by a mirror pyramid employed in the sensor which has but a small number of faces. Such pyramid is not large and produces a minimum moment of load inertia on the shaft of the step motor. In this case higher resolution of the sensor is attained not by increasing the number of faces of the mirror pyramid, but by the use of structural elements, such as the faceted mirror reflector and light guides placed in the casing and producing no additional moment of load inertia on the shaft of the step motor.

With such design, the sensor realizes the principle of multiple employment of the same constructional elements of the sensor in one revolution of the step motor.

The invention will now be described in greater detail with reference to a specific embodiment thereof, particularly when taken in conjunction with the accompanying drawings, wherein.

Figure 1:
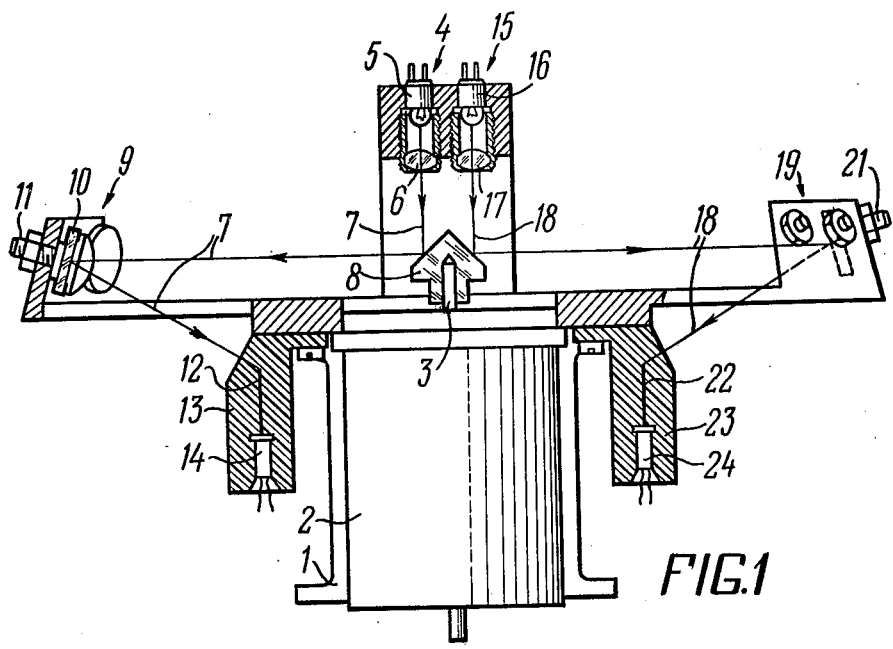
FIG. 1 is a cut-away lateral view of the sensor casing, facets of the mirror reflector and a longitudinal section view of the light source of the disclosed photoelectric position sensor of a step motor, which is secured on a shell of the step motor.

The disclosed photoelectric position sensor of a step motor comprises a casing 1 (FIG. 1) secured shell 2 of the step motor (the figure shows its shaft only). The casing 1 houses a light source 4 including a filament lamp 5 and a focusing lens 6 shaping a light beam 7. A mirror pyramid 8 is placed across the beam 7 and is rigidly secured on the shaft 3 of the step motor.

Figure 2:
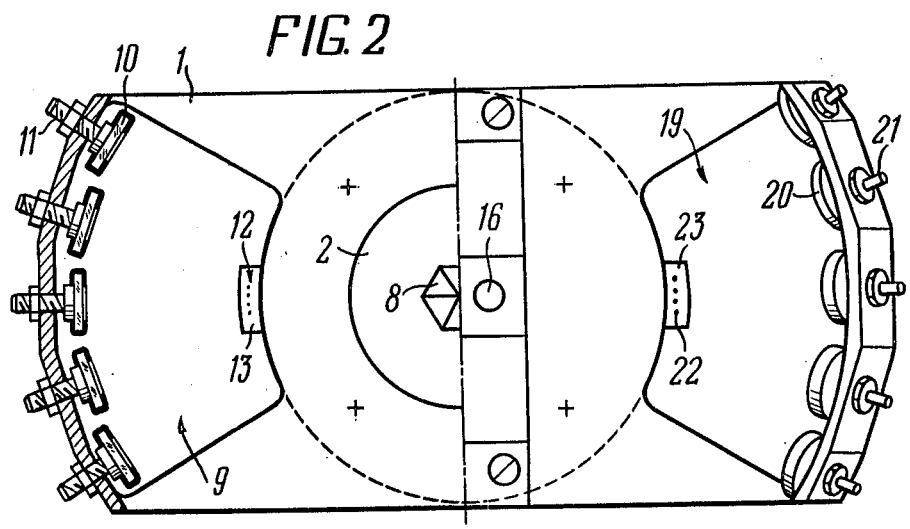
FIG. 2 is a cut-away top view of the sensor casing and the facets of the mirror reflector of the disclosed photoelectric sensor.

A faceted mirror reflector 9 is made in this embodiment of the sensor as a group of separate mirror plates 10 which are the facets of the reflector 9 located across the light beam 7 reflected from the faces of the mirror pyramid 8. Each mirror plate 10 (FIG. 2) is secured in the casing 1 by means of adjusting screws 11.

The photoelectric sensor also comprises a group of light guides 12 made in the disclosed embodiment as fiber wavebeam guides which number is dependent upon the ratio between the number of positions for one revolution of the step motor and the product of the number of faces of the mirror pyramid 8 by the number of facets of the mirror reflector 9, that is the number of the mirror plates 10. The light guides 12 are secured in the casing 1 by means of a mount 13 made of a dielectric material and their first ends are oriented into the light beam 7 (FIG. 1) reflected from a respective facet, that is the plate 10, of the mirror reflector 9. A photoelectric receiver 14 is also secured in the mount 13 and in the disclosed embodiment is made as a photodiode located in the immediate vicinity of the other ends of the light guides 12.

In order to make the photoelectric sensor sensitive to the direction of rotation of the shaft 3 of the step motor, the sensor is additionally provided with a second light source 15 comprising a filament lamp 16 and a focusing lens 17 shaping a light beam 18 and directing it to the mirror pyramid 8. A faceted mirror reflector 19 analogous to the mirror reflector 9 is placed across the light beam 18 reflected from the faces of the mirror pyramid 8. Mirror plates 20 (FIG. 2) of the reflector 19 are secured in the casing 1 by means of screws 21 and shifted to a quarter of the step motor position with respect to the mirror plates 10 of the reflector 9.

Light guides 22 equal in number to the light guides 12 are placed across the light beam 18 (FIG. 1) reflected from the mirror plates 20 (FIG. 2) of the reflector 19. The light guides 22 are secured in the casing 1 by means of a mount 23, wherein a photoelectric receiver 24 (FIG. 1) is also secured similar to the photoelectric receiver 14.

There is a second embodiment of a photoelectric position sensor of a step motor, which is analogous to the one described above.

Figure 3:
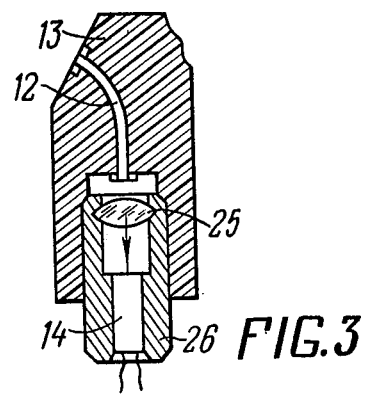
FIG. 3 is a cross-sectional view of a mount with a light guide, a condenser and a photoelectric receiver of the disclosed photoelectric sensor secured therein.

The difference consists in that the light beam 7 emerging from the ends of the light guides 12 facing the photoelectric receiver 14 is supplied to this photoelectric receiver 14 through a condenser, which is, in this embodiment, a focusing lens 25 (FIG. 3) placed in the gap between said ends of the light guides 12 and the photoelectric receiver 14. In the herein disclosed embodiment the lens 25 is secured in the mount 13 by means of a bushing 26, the photoelectric receiver 14 being also secured therein.

Figure 4:
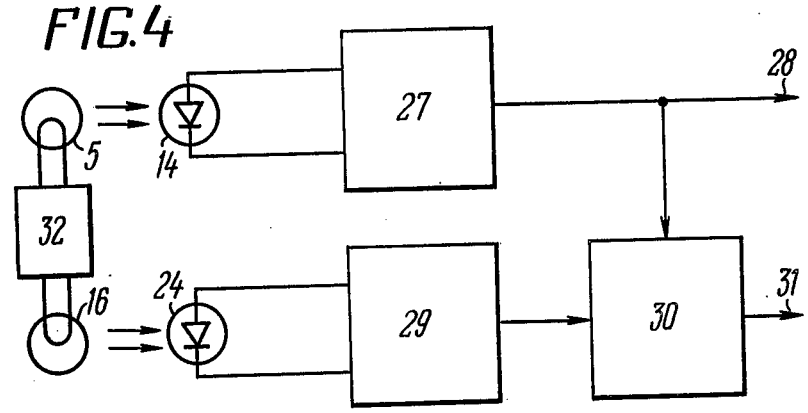
FIG. 4 is a block diagram of the electrical circuitry of the disclosed photoelectric sensor and a conversion circuit for the electrical signals taken from its receivers.

In the process of operation of the photoelectric sensor the photoelectric receiver 14, whose output signal is almost sinusoidal, is connected to a rectangular pulse shaper 27 (FIG. 4). A sequence of rectangular pulses, which corresponds to the number of past positions of the step motor, is produced at the output 28 of the pulse shaper 27.

In order to determine the direction of rotation of the shaft 3 (FIG. 1) of the step motor the photoelectric receiver 24 is in the process of operation also connected to the rectangular pulse shaper 29 (FIG. 4) which, in turn, is connected to the input of a phase-sensitive converter 30 which other input is joined to the output 28 of the pulse shaper 27. A voltage of alternating polarity, which depends on the direction of rotation of the shaft 3 (FIG. 1) of the step motor, is produced at an output 31 of the phase-sensitive converter 30.

The lamps 5 and 16 of the light sources 4 and 15, respectively, are connected in the process of photoelectric sensor operation to a power supply unit 32 (FIG. 4).

The disclosed photoelectric position sensor of a step motor operates as follows.

The luminous flux from the filament lamp 5 (FIG. 1) is brought into a light beam 7 by the focusing lens 6 of the light source 4 and directed to the mirror pyramid 8 secured on the shaft 3 of the stop motor. Depending on the angular position of the pyramid 8, the light beam 7 reflected therefrom falls upon a respective mirror plate 10 of the faceted mirror reflector 9. The light beam 7 is reflected therefrom and lights a respective light guide 12 actuating the photoelectric receiver 14.

When the shaft 3 turns to the next position, the light beam 7 is reflected from the pyramid 8 and the same mirror plate 10 and falls upon the adjacent in the rotation direction light guide 12 and is sensed by the photoelectric receiver 14. The information from said receiver 14 is fed to the rectangular pulse shaper 27 (FIG. 4) as a photo current pulse indicating the position has been passed.

When the shaft 3 (FIG. 1) turns to the number of positions equal to the number of the light guides 12, the light beam 7 is transferred to the next in the rotation direction mirror plate 10. And, finally, when the shaft 3 turns to the number of positions equal to the product of the number of the light guides 10 by the number of the facets of the mirror reflector 9, that is the mirror plates 10, the light beam 7 is transferred to the next, in the direction of rotation, face of the mirror pyramid 8.

The product of the number of faces of the mirror pyramid 8 by the number of facets of the mirror reflector 9 and by the number of the light guides 12 corresponds to the number of fixed positions of the shaft 3 for one revolution of the step motor. In this case the same structural elements of the claimed photoelectric sensor are employed many times to obtain information on the positions passed, which ensures small dimensions of the sensor retaining its high resolution.

In order to determine the direction of rotation of the shaft 3 of the step motor, an electric signal is removed from the photoelectric receiver 24, which is shifted with respect to the signal from the photoelectric receiver 14. The way the light beam 18 travels to reach the photoelectric receiver 24 is analogous to that travel of light beam 7 to the photoreceiver 14.

What is claimed is:

1. In combination a step motor and a photoelectric position sensor, comprising: a step motor having a shaft and having a housing or shell; said photoelectric position sensor of said step motor comprising a casing secured on said shell of said step motor; a light source of said sensor located in said casing of said sensor; a light beam from said light source; a mirror pyramid of said sensor, secured on said shaft on said step motor across said light beam; faces of said mirror pyramid, reflecting said light beam; a faceted mirror reflector of said sensor, located in said casing of said sensor across said light beam reflected from a respective said face of said mirror pyramid; a group of light guides of said sensor, being secured to said casing of said sensor, and their number being determined by the ratio between the number of positions for one revolution of said step motor and the product of the number of said faces of said mirror pyramid by the number of the facets of said mirror reflector; the first ends of said light guides, being located across said light beam reflected from said respective facet of said mirror reflectors; and a photoelectric receiver being located in said casing of said sensor across said light beam emerging from the other ends of said light guides.

2. The combination as claimed in claim 1, comprising: a condenser lens located in said casing of said sensor between said ends of said light guides facing said photoelectric receiver and said photoelectric receiver across said light beam emerging from said ends of said light guides.

3. The combination according to claim 1, further comprising an additional light source located in said casing of said sensor and having a light beam directed to said mirror pyramid, an additional faceted mirror reflector in said casing across from said light beam reflected from a respective said face of said mirror pyramid; a further group of light guides in said casing, their number being equal to said other group of light guides; the first ends of said further group of light guides, being located across the additional light beam reflected from said respective facet of said additional mirror reflector; and an additional photoelectric receiver located in said casing of said sensor across said additional light beam emerging from the other ends of said further group of light guides; whereby said photoelectric position sensor is sensitive to the direction of rotation of said shaft of said step motor.

* * * * *